(12) United States Patent
Bytheway et al.

(10) Patent No.: US 11,359,981 B2
(45) Date of Patent: Jun. 14, 2022

(54) RESISTANCE SENSOR FOR BATTERY SWELL DETECTION

(71) Applicant: Cirque Corporation, Salt Lake City, UT (US)

(72) Inventors: Jared Bytheway, Sandy, UT (US); Brian Monson, Farmington, UT (US)

(73) Assignee: Cirque Corporation, Sandy, UT (US)

( * ) Notice: Subject to any disclaimer, the term of this patent is extended or adjusted under 35 U.S.C. 154(b) by 253 days.

(21) Appl. No.: 16/865,994

(22) Filed: May 4, 2020

(65) Prior Publication Data
US 2021/0341344 A1 Nov. 4, 2021

(51) Int. Cl.
*G01L 1/00* (2006.01)
*G01L 1/22* (2006.01)
*G08B 21/18* (2006.01)

(52) U.S. Cl.
CPC .......... *G01L 1/2287* (2013.01); *G08B 21/182* (2013.01)

(58) Field of Classification Search
CPC ............................ G01L 1/2287; G08B 21/182
See application file for complete search history.

(56) References Cited

U.S. PATENT DOCUMENTS

| | | | |
|---|---|---|---|
| 3,656,340 A | 4/1972 | Ball | |
| 8,691,408 B2 | 4/2014 | Hong | |
| 8,717,186 B2 | 5/2014 | Zhou | |
| 9,442,594 B2 | 9/2016 | Graham | |
| 9,608,297 B2 | 3/2017 | Van Lammeren | |
| 9,673,644 B2 | 6/2017 | Park | |
| 10,122,050 B2 | 11/2018 | Fukuda | |
| 10,158,149 B2 | 12/2018 | Albert | |
| 10,312,555 B2 | 6/2019 | Fukuda | |
| 10,522,814 B2 | 12/2019 | Lee | |
| 10,983,170 B1 * | 4/2021 | Kadirvel | H01M 10/48 |
| 2010/0247980 A1 | 9/2010 | Jang | |
| 2012/0208054 A1 | 8/2012 | Shirasawa | |
| 2013/0093383 A1 | 4/2013 | Kim | |
| 2014/0042961 A1 | 2/2014 | Lan | |
| 2014/0062418 A1 | 3/2014 | Lim | |
| 2015/0137767 A1 | 5/2015 | Kim | |
| 2015/0180016 A1 | 6/2015 | Choi | |
| 2015/0311571 A1 | 10/2015 | Krauss | |
| 2015/0380777 A1 | 12/2015 | Kim | |
| 2016/0064780 A1 | 3/2016 | Jarvis | |
| 2016/0268644 A1 | 9/2016 | Lee | |

(Continued)

FOREIGN PATENT DOCUMENTS

DE 102020118542 B3 * 1/2022
KR 2022013101 A * 2/2022

(Continued)

OTHER PUBLICATIONS

Flexpoint Sensor Systems, BXS Battery Expansion Sensor, 2019, pp. 1-8, www.flexpoint.com (last visited Apr. 16, 2020).

*Primary Examiner* — Max H Noori

(57) ABSTRACT

A portable electronic device may include an electrical resistance sensor and a battery assembly being adjacent to the electrical resistance sensor. The electrical resistance sensor is positioned to be compressed when the battery assembly swells, and the electrical resistance sensor further includes a pressure sensitive material that exhibits a characteristic of changing an electrical conductance when compressed.

20 Claims, 9 Drawing Sheets

(56) References Cited

U.S. PATENT DOCUMENTS

| | | |
|---|---|---|
| 2017/0077717 A1 | 3/2017 | Lundgren |
| 2017/0331157 A1 | 11/2017 | Newman |
| 2018/0159183 A1* | 6/2018 | Jarvis ................ H01M 10/4257 |
| 2018/0261824 A1 | 9/2018 | Ju |
| 2021/0226264 A1* | 7/2021 | Bytheway ............. H01M 10/48 |
| 2022/0109197 A1* | 4/2022 | Glad ..................... G06F 3/0445 |

FOREIGN PATENT DOCUMENTS

| | | | |
|---|---|---|---|
| WO | WO-2022014955 A1 | * | 1/2022 |
| WO | WO-2022025705 A1 | * | 2/2022 |

* cited by examiner

1300

> Determine a battery has an increased sized based, at least in part, on a signal exhibiting a changed electrical conductance where the signal is from an electrical resistance sensor that includes a pressure sensitive material that exhibits a characteristic of changing electrical conductance when compressed — 1302

> Detect swelling of a battery assembly incorporated into the portable electronic device when an electrical resistance sensor is compressed and the electrical resistance sensor is incorporated into the portable electronic device where the electrical resistance sensor includes a pressure sensitive material that exhibits a change in electrical conductance when compressed by taking at least one measurement based on a predetermined schedule — 1402

> Detect swelling of a battery assembly incorporated into the portable electronic device when an electrical resistance sensor is compressed and the electrical resistance sensor is incorporated into the portable electronic device where the electrical resistance sensor includes a pressure sensitive material that exhibits a change in electrical conductance when compressed by taking at least one measurement that is triggered by a predetermined event — 1502

Fig. 15

RESISTANCE SENSOR FOR BATTERY SWELL DETECTION

FIELD OF THE DISCLOSURE

This disclosure relates generally to systems and methods for detecting a size. In particular, this disclosure relates to systems and methods for sensing changes in battery size using a resistance sensor.

BACKGROUND

A change in a size may depict a condition that is useful to know. For example, changes in the size of certain device components may indicate that a part is nearing a failure or indicate the presence of a dangerous situation. Lithium-ion (Li-ion) batteries are often used in numerous consumer, military, and aerospace electronic goods such as laptops, cellular phones, satellites, spacecraft, and the like. Li-ion batteries can present safety hazards because they contain a flammable electrolyte (typically a Li salt) and may need to be kept pressurized. Li-ion batteries can swell as they start to get old and degrade.

A swollen battery is a potentially dangerous problem in devices that have a restricted space constraint. Traditionally, laptops, for example, enclosed batteries in rigid plastic or metal cases that confined any swelling and prevented it from pushing into other parts of the laptop. Typical battery packs may include a few individual battery cells. Presently, as laptops have become thinner and lighter, individual battery cells are often encapsulated in a vacuum sealed plastic pouch or bag, and if the battery cell swells the battery pack pushes on components around it. This typically means it pushes on the keyboard and/or the touchpad. Forces from a swollen battery can be quite large and can cause mechanical damage. Other drawbacks, disadvantages, and inconveniences of present systems and methods also exist.

An example of a battery detection system is disclosed in U.S. Patent Publication No. 2014/0042961 issued to Chi-Ming Lan. This reference discloses an electronic device and a method for detecting the swelling of a battery. The electronic device includes a battery module, a swelling detection module, and a system. The battery module includes at least one battery therein. The deformation module is deposed within the battery module and is configured to detect the swelling of the battery thereby generating a signal. The system is configured to receive the signal directly transmitted from the deformation module, and to determine whether the signal is greater than a first setting value or less than a second setting value, such that when the signal is greater than the first setting value or less than the second setting value, the system activates a protection mechanism to prevent the battery from further swelling.

Another example of a battery detection system is disclosed in U.S. Pat. No. 8,691,408 issued to Eui-Sun Hong, et al. This reference discloses a secondary battery that includes a case having positive and negative electrodes, a safety device attached to a surface of the case and having a resistance value which changes during swelling of the case, and a protective circuit module attached to a side of the case while being electrically connected to the safety device. The resistance value of the safety device changes as the case swells, and the protective circuit module reduces or interrupts charging/discharging currents in response thereto. The safety device can be used for all secondary batteries regardless of capacity, can quickly react against abruptly rising internal temperature and rapid swelling, and can stably prevent swelling which occurs above an allowable temperature. Both of these references are herein incorporated by reference for all that they teach.

SUMMARY

In some embodiments, a portable electronic device may include an electrical resistance sensor and a battery assembly being adjacent to the electrical resistance sensor. The electrical resistance sensor is positioned to be compressed when the battery assembly swells, and the electrical resistance sensor further includes a pressure sensitive material that exhibits a characteristic of increasing an electrical conductance when compressed.

The pressure sensitive material may be a resistive ink.

The pressure sensitive material may be a quantum tunneling composite.

The pressure sensitive material may be a void bearing material.

The electrical resistance sensor may include a first electrode connected to a first side of the pressure sensitive material and a second electrode connected to a second side of the pressure sensitive material.

The electrical resistance sensor may be in communication with a controller that determines that the battery assembly has an increased size in response to the pressure sensitive material having the changed electrical conductance.

The changed electrical conductance may be an increased electrical conductance.

The changed electrical conductance may be a decreased electrical conductance.

The controller may be programmed to use the electrical resistance sensor to take a measurement on a predetermined schedule.

The controller may be programmed to use the electrical resistance sensor to take a measurement in response to a predetermined event.

The controller may be programmed to determine a force exerted by the battery on the electrical resistance sensor based at least in part on an amount of changed electrical conductance exhibited by the pressure sensitive material.

The electrical resistance sensor may be located between a structural feature of the portable electronic device and the battery assembly.

The electrical resistance sensor may be in physical contact with at least one cell of the battery assembly.

The electrical resistance sensor may be one of multiple electrical resistance sensors disposed within the portable electronic device, and each cell of the battery assembly is in physical contact with at least one of the multiple electrical resistance sensors.

The electrical resistance sensor may be compressed by being sandwiched between the battery and an internal surface within the portable electronic device when the battery has an increased size.

A method of detecting an increased size of a battery may include determining a battery has an increased sized based, at least in part, on a signal exhibiting an increased or decreased electrical conductance where the signal is from an electrical resistance sensor that includes a pressure sensitive material that exhibits a characteristic of increasing or decreasing electrical conductance when the pressure sensitive material is compressed.

The pressure sensitive material may be compressed by being sandwiched between a pressure from the battery and a surface within the portable electronic device.

The pressure sensitive material may be a resistive ink.

The method may include applying, with a first electrode connected to a controller, a voltage to a first side of a pressure sensitive material; measuring, with a second electrode connected to the controller, a resulting voltage from a second side of the pressure sensitive material; and determining a difference in the resulting voltage from a previous measurement.

The method may include sending an alert to a user when the electrical conductance changes past a predetermined threshold.

A computer-program product for use in a portable electronic device where the computer-program product may include a non-transitory computer-readable medium storing instructions executable by a processor to detect swelling of a battery assembly incorporated into the portable electronic device from an electrical resistance sensor incorporated into the portable electronic device where the electrical resistance sensor includes a pressure sensitive material.

In some examples, the instructions may be executable by the processor to apply a voltage to a first side of a pressure sensitive material, measure a resulting voltage from a second side of the pressure sensitive material, and determine a difference in the resulting voltage from a previous measurement.

In other examples, the instructions may be executable with a voltage divider circuit. In some cases, the voltage divider circuit includes connecting a terminal resistor to a terminal of electrical resistance sensor. The terminal of the electrical resistance sensor may be connected at 0V while the terminal of the resistor is connected to a set voltage. The voltage is measured at an output node that is between the resistor and the sensor. In this example, as pressure is applied to the pressure sensitive material, the voltage changes at the output node.

Detecting swelling may include taking at least one measurements based on a predetermined schedule.

Detecting swelling may include taking at least one measurements triggered by a predetermined event.

BRIEF DESCRIPTION OF THE DRAWINGS

FIG. 13 depicts an example of a detecting battery swell in accordance with the disclosure.

FIG. 14 depicts an example of a detecting battery swell in accordance with the disclosure.

FIG. 15 depicts an example of a detecting battery swell in accordance with the disclosure.

Figure 1:
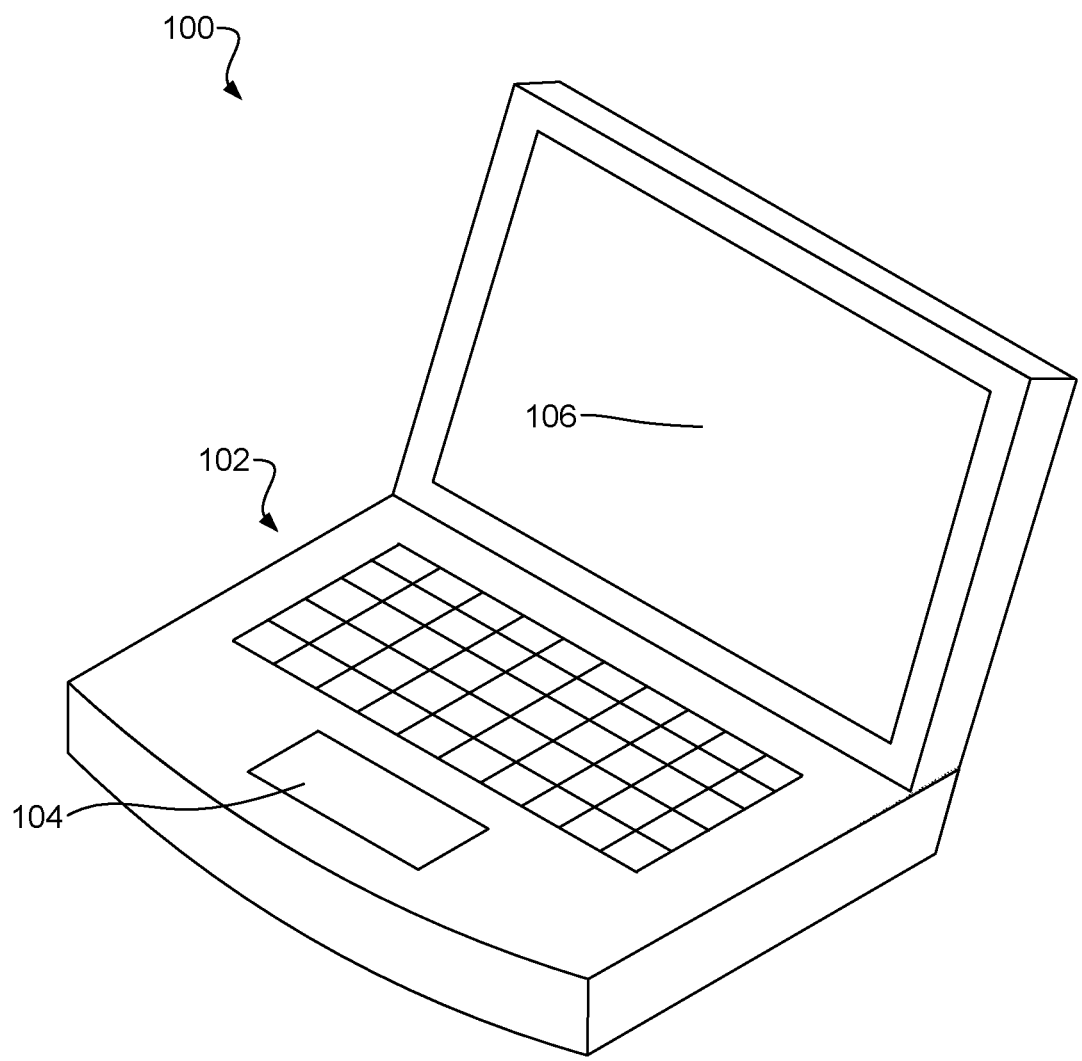
FIG. 1 depicts an example of a portable electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "portable electronic device" may generally refer to devices that can be transported and includes a battery and electronic components. Examples may include an electric vehicle, a hybrid vehicle, a laptop, a desktop, a mobile phone, an electronic tablet, a personal digital device, a watch, a gaming controller, another device, or combinations thereof. For the purposes of this disclosure, the term "mechanical communication" generally refers to being in direct physical contact or being in indirect physical contact. As an example, a material that is in direct physical contact with an object may touch the object. On the other hand, a material that is in indirect physical contact with the object may include being in direct physical contact with an intervening material (or intervening materials) that is in direct physical contact with the object. In this type of example, when the material is moved, the material may cause the intervening material to move, which causes the object to move.

For the purposes of this disclosure, the term "resistive ink" may generally refer to inks, liquid polymers, or other types of flowable materials that can conduct electricity and exhibit at least some degree of electrical resistance. In some examples, a resistive ink may include graphite, silver, carbon, conductive polymers, metallic compounds, other electrically conductive materials, alloys thereof, combinations thereof, or mixtures thereof.

For the purposes of this disclosure, the term "void bearing material" may generally refer to a material that includes electrically conductive materials having a void ratio high enough to affect the electrical conductance of the material. In some examples, without sufficient pressure applied to the void bearing material, the void to material ratio may be large enough that the material exhibits a low electrical conductance. However, in some of these examples when sufficient pressure is applied to the void bearing material, the electrically conductive materials may be generally moved close enough thereby reducing the size of the voids and decreasing the void to material ratio to cause the effect of increasing the electrical conductance of the composite. In some cases, the void bearing material may be caused by the particle size distribution of the electrically conductive particles of the material. In other examples, an electrically conductive material may be fractured to create the voids.

For the purposes of this disclosure, the term "quantum tunneling composite" may generally refer to a composite that includes electrically conductive materials and electrically insulating materials. In some cases, the electrically insulating material may be a non-conducting elastomeric binder. In some examples, without sufficient pressure applied to the quantum tunneling composite, the electrically conductive materials may be generally spaced too far apart to or be in minimal contact with each other to allow for the composite to exhibit a high electrical conductance. However, in some of these examples when sufficient pressure is applied to the quantum tunneling composite, the electrically conductive materials may generally be moved close enough or be brought more frequently in contact with each other to have the effect of increasing the electrical conductance of the composite.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touchpad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

While many of the examples below are depicted with reference to a battery size detection system, the system may be applied to detect size changes in any type of objects. For example, the size detection system may be used to detect the size changes of solids, gases, liquids, combinations thereof, or complex devices, such as battery assemblies. In examples with batteries, the batteries may be located in a laptop, a mobile device, an electronic tablet, a vehicle, or another type of device. A non-exhaustive list of battery types that may be used, include, but are not limited to, lithium batteries, lithium sulphur batteries, alkaline batteries, solid state batteries, graphite based batteries, magnesium based batteries, fluoride based batteries, sodium based batteries, or other types of batteries, or combinations thereof.

FIG. 1 depicts an example of a portable electronic device 100. In this example, the portable electronic device is a laptop. In the illustrated example, the portable electronic device 100 includes an input device, such as a keyboard 102 and a touch pad 104. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100. In other examples, the portal electronic devices may include phones, electronic tablets, electric vehicles, clocks, autonomous vehicles, hybrid vehicles, displays, personal digital assistants, watches, communication devices, remote locks, wearable devices, game controllers, cameras, medical devices, pacemakers, implantable devices, remote controllers, other types of portable electronic devices, or combinations thereof.

Figure 2:
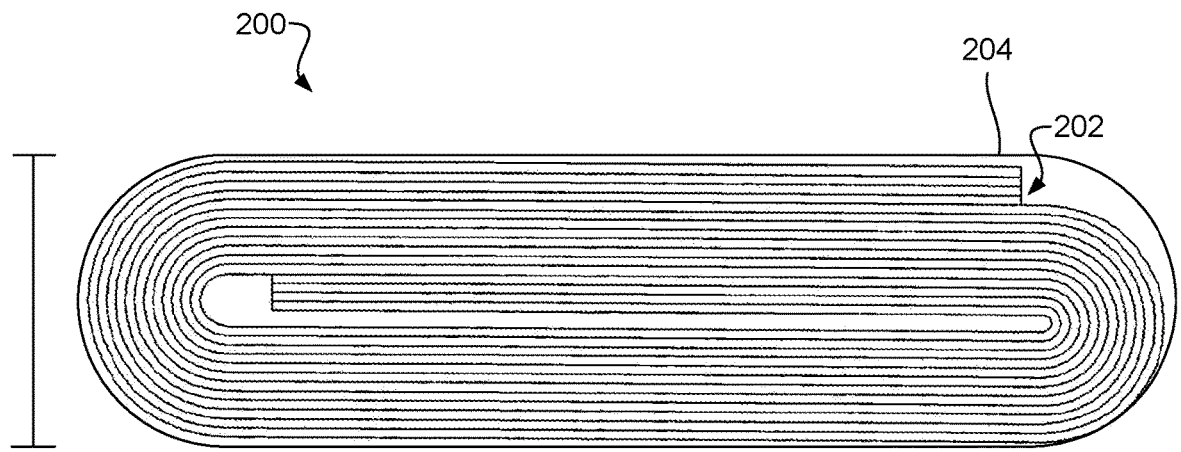
FIG. 2 depicts an example of a battery in accordance with the disclosure.

FIG. 2 depicts a cross section of an example of a battery 200. In this example, the battery 200 includes multiple metal layers 202 arranged side by side and rolled together. The metal layers are disposed within a pouch 204.

Figure 3:
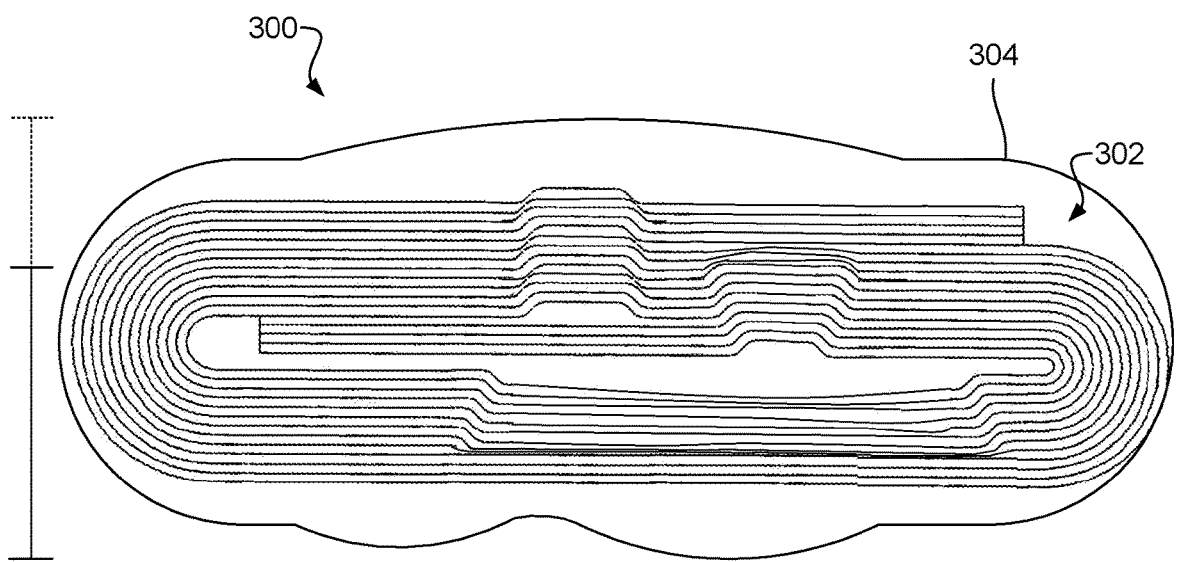
FIG. 3 depicts an example of a swollen battery in accordance with the disclosure.

FIG. 3 depicts an example of a swollen battery 300 due to out gassing from the metal layers 302. In this example, the gas increases the pressure between the metal layers 302 causing separation between the metal layers. Additionally, the increased internal pressure may also expand the pouch 304 outward. Separation between the metal layers 302 and/or expansion of the pouch 304 may increase the battery's overall size.

Figure 4:
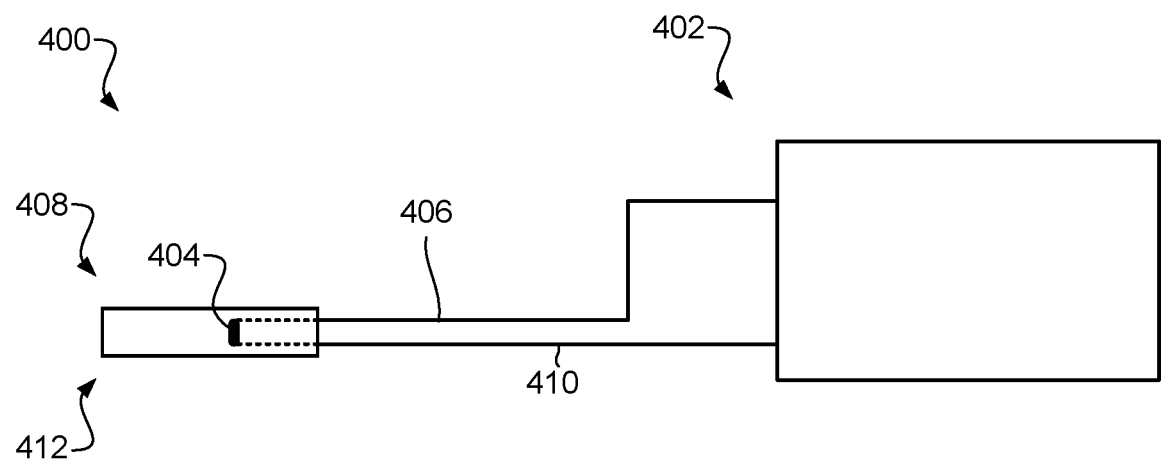
FIG. 4 depicts an example of an electrical resistance sensor and a controller in accordance with the disclosure.

FIG. 4 depicts an example of an electrical resistance sensor 400 in communication with a controller 402. The electrical resistance sensor 400 includes a pressure sensitive material 404 that exhibits a characteristic of changing its electrical conductivity when under pressure. A first electrode 406 connects the controller 400 to a first side 408 of the pressure sensitive material 404 of the electrical resistance sensor 400, and a second electrode 410 connects the controller 400 to a second side 412 of the pressure sensitive material 404.

The controller 402 may send an electrical signal to the first side 408 of the pressure sensitive material 404. In some examples, the electrical signal may be a voltage. The electrical resistance of the pressure sensitive material 404 may affect the resulting signal measured from the second electrode 410. When no pressure is applied, the value of the resulting voltage may be consistent given that the electrical signal applied on the first electrode is also consistent.

However, in examples where a pressure is exerted on the electrical resistance sensor 400, the pressure sensitive material 404 may be compressed. This compression may result in the pressure sensitive material 404 exhibiting a high value of electrical conductance. In some examples, the pressure exerted on the electrical resistance sensor 400 is a compressive force where the electrical resistance sensor 400 is sandwiched between two objects that are pushing on the electrical resistance sensor 400. For example, the two objects that are pushing on the electrical resistance sensor may include the battery and an internal component within the portable electronic device. In some examples, a voltage divider circuit may be used to detect changes in the electrical resistance sensor. In some examples, the pressure sensitive material may be in series with a resistor and an output node. Electrical changes of the pressure sensitive material may be detected at the output node.

Figure 5:
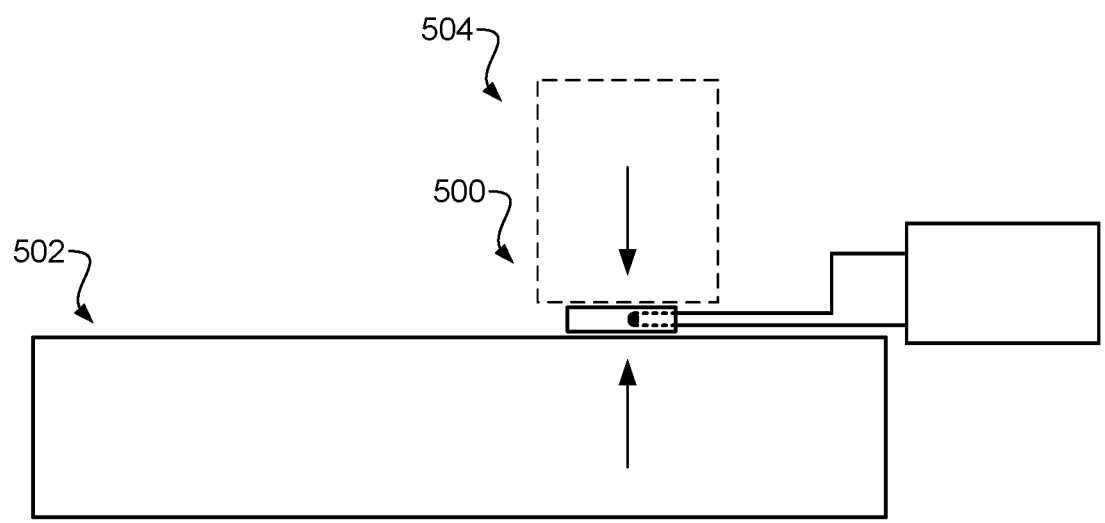
FIG. 5 depicts an example of an electrical resistance sensor adjacent to a battery in accordance with the disclosure.

FIG. 5 depicts an example of an electrical resistance sensor 500 adjacent to a battery 502. In this example, when the battery 502 expands due to an increase in the internal pressure within the battery, the battery 502 may push against the electrical resistance sensor 500. In some examples, merely pushing on the electrical resistance sensor 500 from just one direction exerts sufficient pressure on the pressure sensitive material to cause the change in the pressure sensitive material's electrical conductance. However, in other examples, a pressure force may be applied from multiple directions. For example, an internal structure 504 disposed within the portable electronic device may also be adjacent to the battery 502. In some cases, the internal structure 504 may be located on an opposite side of the electrical resistance sensor to the side that is located nearest to the battery 502. As a result, the battery 502 may push the electrical resistance sensor 500 against the internal structure 504 causing opposing forces to push against the electrical resistance sensor 500 in opposing directions. In this situation, the electrical resistance sensor 502 may be compressively sandwiched from two sides and may cause a change in the electrical conductance of the pressure sensitive material.

In some examples, the electrical resistance sensor is located outside of the components of the battery, such as, for the battery's pouch, a battery casing, another component of the battery of combinations thereof. Further, the internal structure within the portable electronic device may also be located outside of the battery's components, such as outside of the battery's pouch and/or casing. In some examples, the electrical resistance sensor is in direct or indirect contact with the battery's pouch and/or casing. As the pouch and/or casing expand, pressure may be applied to the electrical resistance sensor to assist in compressing the pressure sensitive material of the electrical resistance sensor.

While this example depicts a single electrical resistance sensor per battery cell, more than one electrical resistance sensor may be positioned adjacent to one or more cells of the battery pack. In some examples, more than one electrical resistance sensor may be positioned adjacent to the same side of the battery cell. In other examples, a first electrical resistance sensor may be positioned adjacent a first side of a battery, and a second electrical resistance sensor may be placed on a second side of the battery, where the second side is different than the first side. In some cases, the first side and the second side may be opposite to each other. But, in some cases, the first and second sides may be contiguous to each other. In cases, multiple electrical resistance sensors may be placed on multiple sides of the battery. Further, in some examples, some battery cells may have a differing number of electrical resistance sensors than other battery cells.

Figure 6:
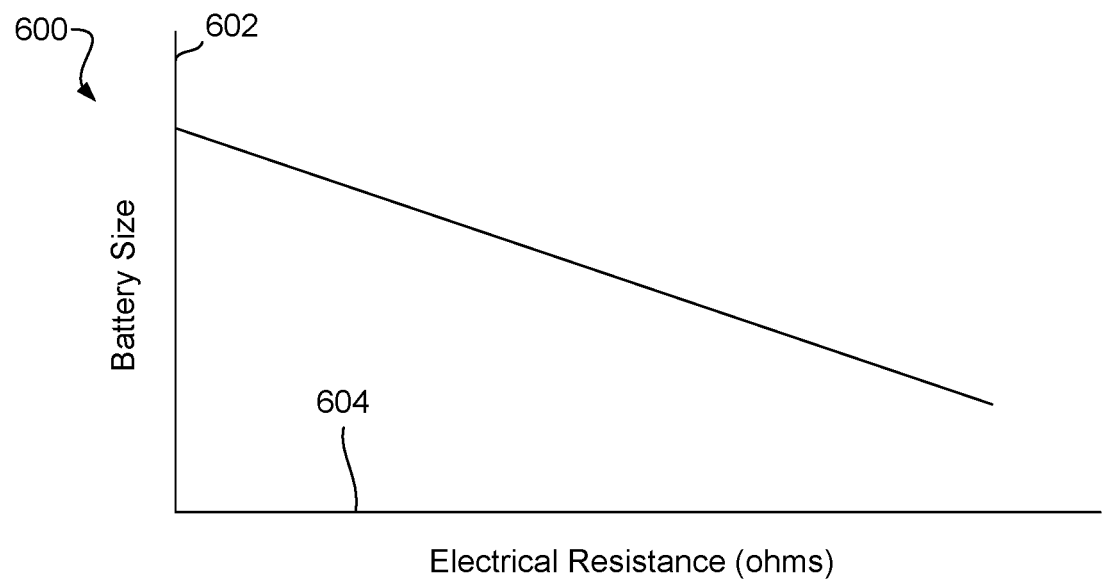
FIG. 6 depicts an example of a characteristic of a pressure sensitive material adjacent to a battery in accordance with the disclosure.

FIG. 6 depicts an example of a chart 600 illustrating a general characteristic of the pressure sensitive material. In this example, the y-axis 602 schematically represents a battery size, and the x-axis 604 schematically represents an electrical resistance of the pressure sensitive material. Electrical resistance is a measure of the opposition to the flow of electrical current, and electrical conductance is the inverse measurement representing the ease through which the electric flow can pass through an object.

In this example with the electrical resistance sensor positioned adjacent to the battery, when the battery size increases, the electrical resistance of the pressure sensitive material decreases. In other words, the electrical conductance of the pressure sensitive material increases. While this example has been depicted with a specific linear relationship between battery size and electrical resistance, the principles described in this disclosure may include any appropriate type of relationship between the battery size and the electrical resistance of the pressure sensitive material. A non-exhaustive list of relationships may include, but are not limited to, positive relationships, negative relationships, linear relationships, steep relationships, relatively flat linear relationships, exponential relationships, curved relationships, non-linear relationships, inverse relationships, quadratic relationships, inverse square relationships, other types of relationships, or combinations thereof. In some examples, the electrical conductance decreases when pressure is applied to the pressure sensitive material.

In some examples, the controller may determine the amount of battery swell based on the value from the electrically resistance sensor. In some examples, the amount of battery swell may be correlated to an amount of pressure within the battery. An alert may be triggered or a remedial action may be triggered based on the amount of pressure measured with the electronic resistance sensor.

Any appropriate type of remedial action may be triggered in response to detected battery swelling. In some examples, the portable electronic device may cause the data stored on the portable electronic device to be sent to a backup storage, which may or may not be located on the portable electronic device. Another remedial action may include restricting the types of functions that can be performed by the portable electronic device until the battery is replaced. In other examples, the remedial action may include have the portable electronic device operate in a low power setting. Another remedial action may include turning off the portable electronic device. In other examples, other remedial actions may be executed in response to detecting battery swell.

Figure 7:
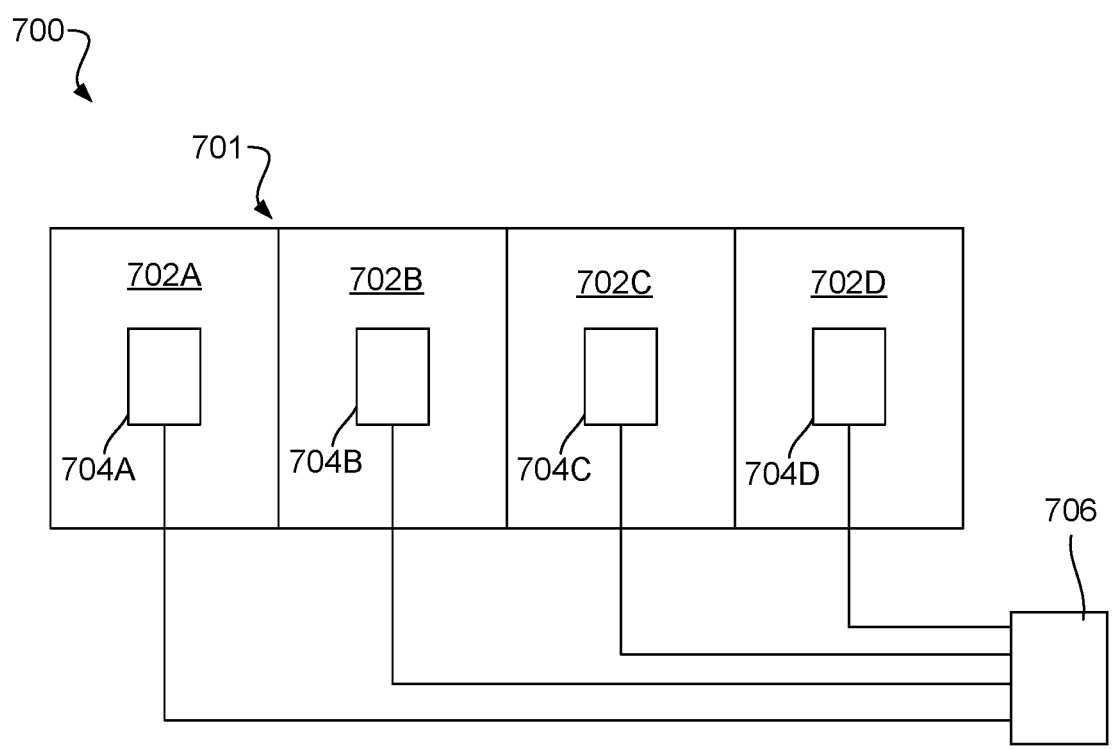
FIG. 7 depicts an example of an electrical resistance sensors adjacent cells of a battery pack in accordance with the disclosure.

FIG. 7 depicts an example of a multi-cell battery size detection system 700 in accordance with the present disclosure. The battery 701 is depicted as having multiple cells 702A, 702B, 702C, 702D. Independent electrical resistivity sensors 704A, 704B, 704C, 704D may be positioned adjacent each of the cells 702A, 702B, 702C, 702D. In the illustrated example, each of the electrical resistivity sensors 704A, 704B, 704C, 704D may be individually connected to a controller 706. In this example, the batter size detection system may have the ability to detect which cells are swollen and determine if any of the cells are not swollen. Such information may be helpful to technicians who are to remove the cells from the portable electronic device. Additionally, data about which cells are swollen verses those cells that are not may be recorded and stored for later analysis.

Figure 8:
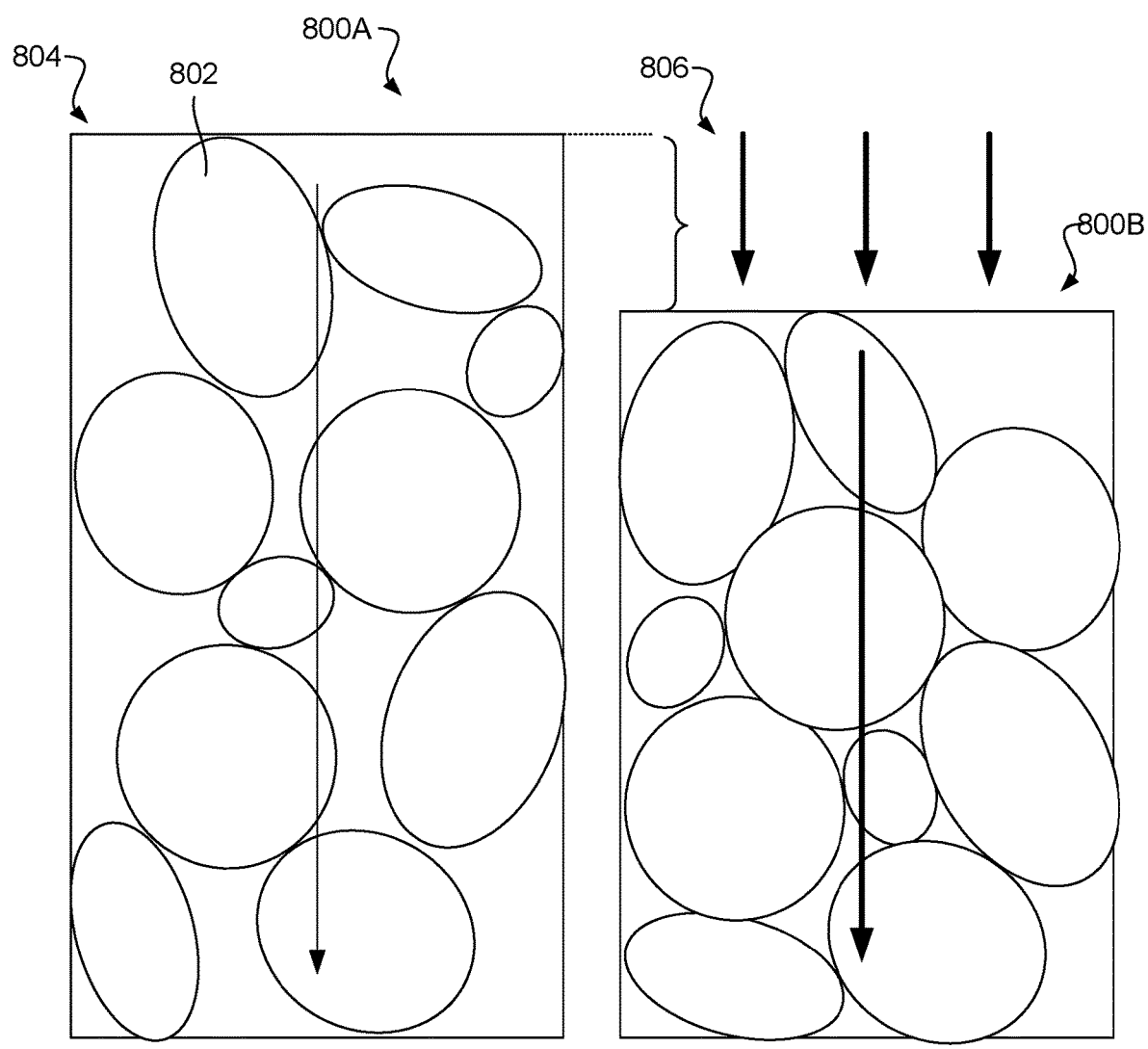
FIG. 8 depicts an example of a pressure sensitive material in accordance with the disclosure.
Figure 9:
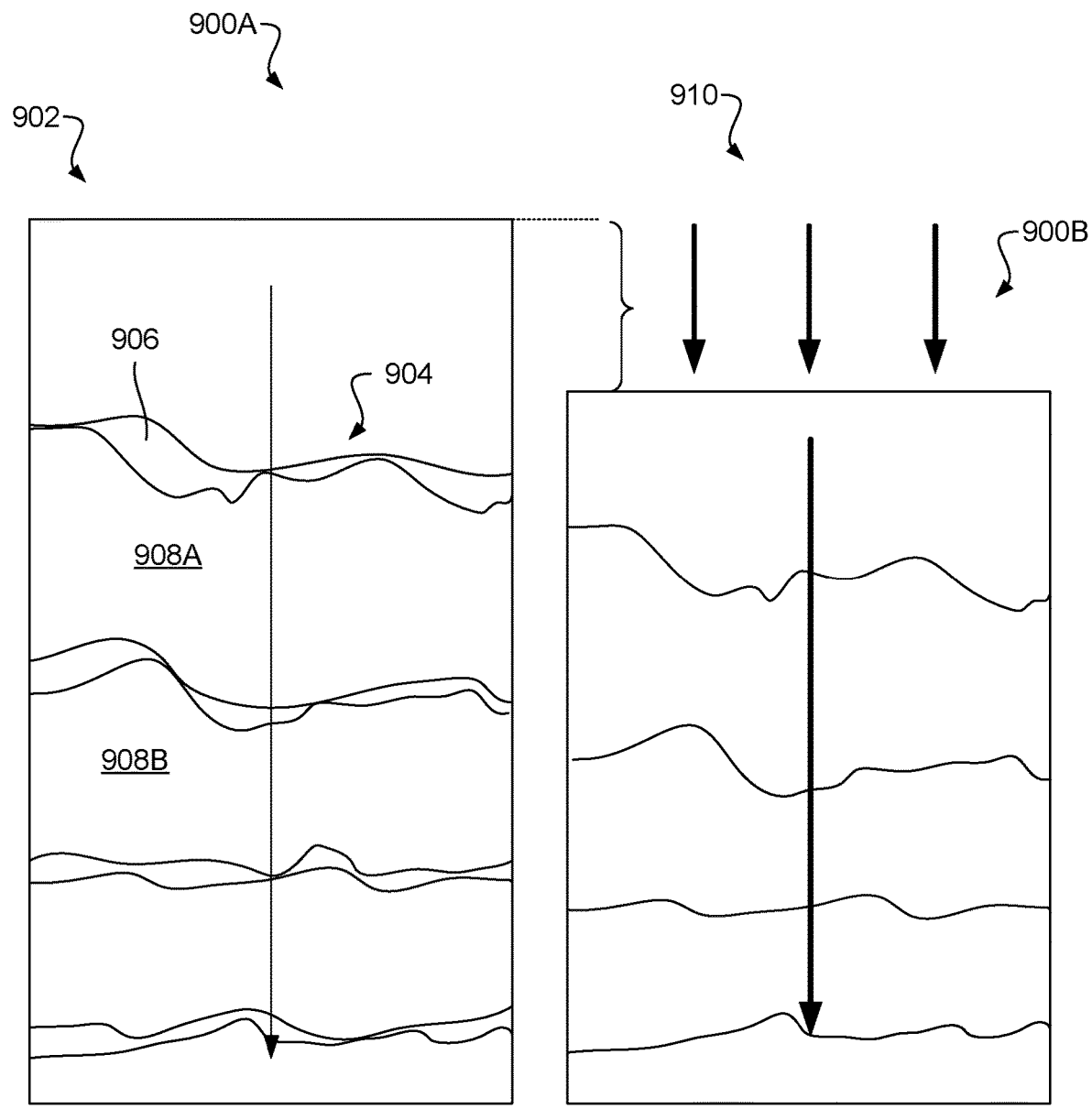
FIG. 9 depicts an example of a pressure sensitive material in accordance with the disclosure.
Figure 10:
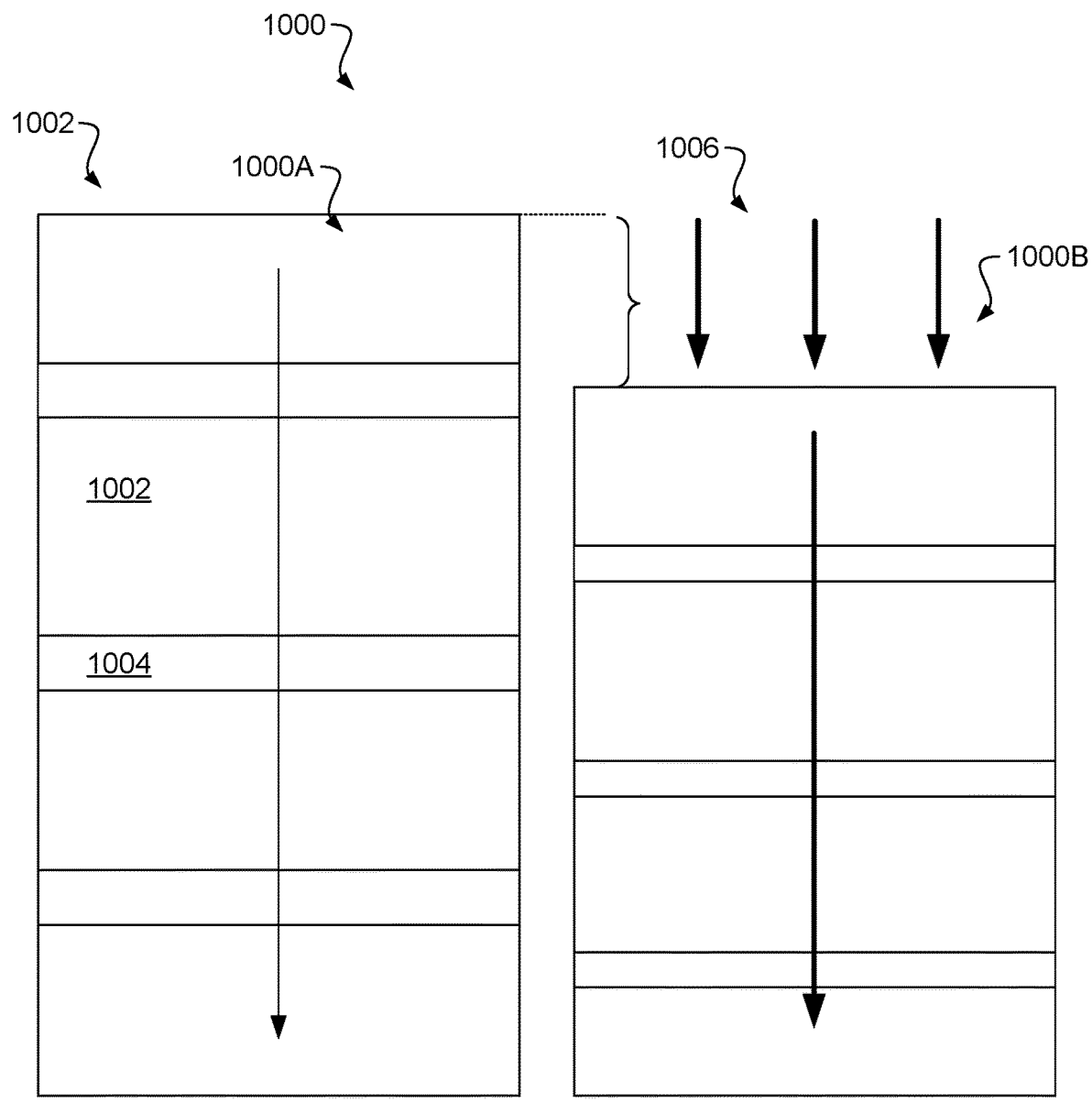
FIG. 10 depicts an example of a pressure sensitive material in accordance with the disclosure.

FIGS. 8-10 depict examples of pressure sensitive materials that may be compatible with the present disclosure.

FIG. 8 depicts a material 800 that includes electrically conductive particles 802. On the left side 804 of the figure, the material 800A is depicted in a condition where no active pressure is applied. Due to the distribution sizes of the electrically conductive particles, when the material is not subjected to an external pressure, a void to volume ratio is high enough to negatively affect the electrical conductance of the material. In some cases, the void to volume ratio when no active pressure is applied may not be so high that the material does not conduct electricity. In other cases, the void to volume ratio may be high enough that the material cannot conduct an electrical signal.

On the right side 806 of the figure, the material 800B is depicted as though a pressure is being actively applied to the material. In this example, the electrically conductive particles are forced closer together causing more surface area to surface area contacts between the electrically conductive particles. With the electrically conductive particles closer together, the electrical resistance of the material decreases. Thus, in examples where the battery pushes against the electrical resistance sensor such that the pressure sensitive material is compressed, the electrical conductance of the signal changes. The changed electrical conductance can be detected to determine that the battery is swelling.

FIG. 9 depicts an example where the material 900 is fractured. On the left side 902 of the figure where the material 900A is depicted without pressure being applied, the fractures 904 cause the formation of voids 906 in the material. The voids 906 may span substantially the width of the material 900A and limit the amount of contact between the segments 908 of the material. As a result, the electrical resistance of the material may be reduced. In some cases, some of the electrons may be able to pass through the relatively larger voids 906 when no pressure is applied to the material 900A due to points of the material segments where there is surface to surface contact. However, in some cases, some of the electrons may pass from fractured segment 908A to fractured segment 908B through a tunneling effect where electrons are shown to pass through voids under appropriate circumstances.

On the right side 910 of the figure where the material 900B is depicted with having pressure applied, the material is compressed so that the voids formed by the fractures are reduced. In this example, the number of contact points between the segments of the fractured material may increase. Further, in those examples where the tunneling effect is exhibited, having a reduction in the size of the voids may increase the electrical conductivity of the material. While this example is depicted with the pressure sensitive material increasing in response to pressure, in other examples, the void forming material may decrease electrical conductance in response to an application of pressure.

FIG. 10 depicts an example of a quantum tunneling composite material 1000. On the left side 1002 of the figure, an uncompressed composite material 1000A is depicted. The composite material 1000A includes electrically conductive portions 1002 and electrically insulating portions 1004. In this example, due to the quantum tunneling effect where electrons are exhibited to pass through electrical insulators under the right conditions, the composite material 1000A can conduct an electrical signal with a relatively high resistance.

The compressed composite material 1000B depicted on the right side 1006 of the figure is depicted under pressure. In this example, the electrically insulating material 1004 may be compressed to have a smaller thickness resulting in less distance between the electrically conductive portions 1002 of the composite material 1000. The smaller distance between the electrically conductive portions 1002 may increase the composite material's overall electrical conductance through the quantum tunneling effect. In other examples, the quantum tunneling composite may have the characteristic of decreasing electrical conductance in response to pressure.

Figure 11:
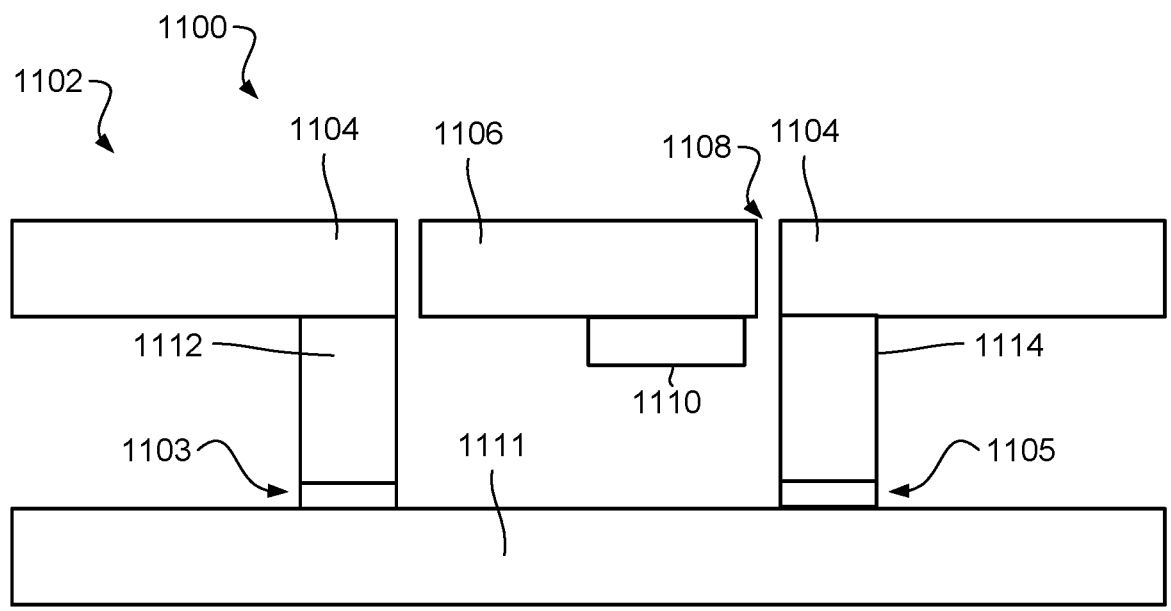
FIG. 11 depicts an example of a battery swell detection system incorporated into a portable electronic device in accordance with the disclosure.

FIG. 11 depicts an example of a size detection system 1100 incorporated into an electronic device 1102. In this example, the size detection system 1100 includes a first electrical resistance sensor 1103 and a second electrical resistance sensor 1105 incorporated into a structure of the electronic device 1102.

The electronic device 1102 includes a keyboard surface 1104 and a track pad assembly 1106 positioned in an opening 1108 defined in the keyboard surface 1104, and a controller 1110 incorporated into the track pad assembly 1106. The track pad assembly 1106 may include a sensor that includes at least one electrode for determining a proximity input over the track pad assembly 1106 or a touch input on to the touch pad assembly 1106. The controller 1110 may determine capacitance measurements from the electrode to determine the proximity and/or touch inputs of the track pad assembly 1106.

The first electrical resistance sensor 1103 and the second electrical resistance sensor 1104 may be positioned to detect a size change in a battery assembly 1111 of the electronic device 1102. The first electrical resistance sensor 1103 may be positioned between a first internal structure 1112 of the electronic device's structure, and the second electrical resistance sensor 1105 may be positioned between a second internal structure 1114 of the electronic device's structure. Each of the first internal structure 1112 and the second internal structure 1114 may provide a reference surface against which the respective electrical resistance sensors may push against as portions of a battery assembly 1111 expand.

In this example, the first electrical resistance sensor 1103 and the second electrical resistance sensor 1105 may be in communication with a dedicated controller for interpreting their respective measurements. In some examples, the first electrical resistance sensor 1103 and the second electrical resistance sensor 1105 may be in communication with the controller 1100 for the track pad assembly 1106, which has additional circuitry to interpret the change in the resistance of the electrical resistance sensors 1102, 1104.

Figure 12:
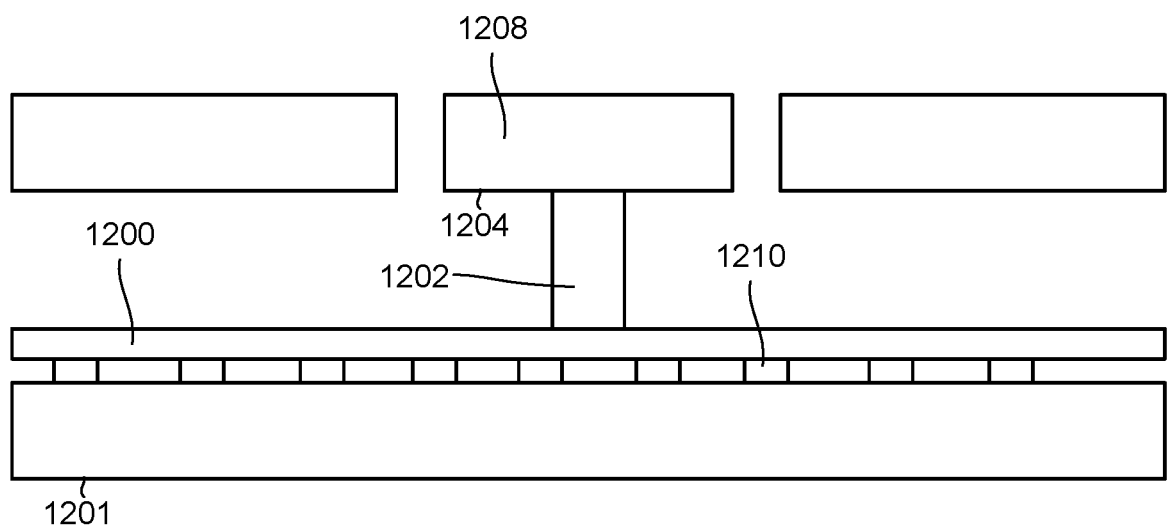
FIG. 12 depicts an example of a battery swell detection system incorporated into a portable electronic device in accordance with the disclosure.

In the illustrated example of FIG. 11, the region of the battery assembly 1111 immediately subjacent to the track pad assembly 1106 is void of an electrical resistance sensor. However, in the embodiment illustrated in FIG. 12, a sensing strip 1200 is positioned over the length of the battery assembly 1201. The sensing strip 1200 may include components and arrangements similar to the arrangements described in conjunction with the examples from FIGS. 1-10 or another type of resistance sensing arrangement configured to detect size changes. In this example, a connector 1202 connects the sensing strip 1200 to the underside 1204 of the track pad assembly 1208 or to another appropriate location within the portable electronic device. The connector 1202 may provide physical resistance to movement of the electrical resistance sensors 1210 as the battery assembly 1201 swells thereby causing the electrical resistance sensors 1210 to be compressed by the physical resistance of the connector 1202 and the battery assembly 1201 as the batteries swell. In some examples, the connector 1202 may electrically connect the sensing strip 1200 to a controller to interpret the resistance changes.

In some examples, the electrical resistance sensor may be spaced away from the battery at a distance and be in indirect contact with the battery through a spacer or another mechanical component. As the battery increases in size, the spacer or mechanical component may push on the electrical resistance sensor causing at least a portion of the pressure sensitive material to compress. In some examples, the entire pressure sensitive material is compressed. In other examples, just a portion of the pressure sensitive material and/or just a portion of the electrical resistance sensor is compressed. In some examples, the pressure from the spacer within the portable electronic component and the increased battery size may cause the electrical resistance sensor to bend in such a way that puts a strain on a portion of the electrical resistance sensor, but causes the pressure sensitive material to compress thereby changing the electrical conductance of the pressure sensitive material.

FIG. 13 depicts an example of a method 1300 for detecting battery swelling. This method 1300 may be performed based on the description of the devices, module, and principles described in relation to FIGS. 1-12. In this example, the method 1300 includes determining 1302 a battery has an increased size based, at least in part, on a signal exhibiting a changed electrical conductance where the signal is from an electrical resistance sensor that includes a pressure sensitive material that exhibits a characteristic of increasing electrical conductance when pressure is applied.

FIG. 14 depicts an example of a method 1400 of detecting a battery swelling. This method 1400 may be performed based on the description of the devices, module, and principles described in relation to FIGS. 1-12. In this example, the method 1400 includes detecting 1402 swelling of a battery assembly incorporated into the portable electronic device when an electrical resistance sensor is compressed and the electrical resistance sensor is incorporated into the portable electronic device where the electrical resistance sensor includes a pressure sensitive material that exhibits a change in electrical conductance when compressed by taking at least one measurement based on a predetermined schedule.

As an example, the voltage may be applied to the first electrode and then measured with the second electrode based on a periodic schedule rather than on a continual basis. In some examples, the electrical resistance sensor may check for battery swelling once a minute, once an hour, once a day, once a week, once a month, once in another predetermined period of time, or combinations thereof. In some cases, portable electronic device with newer batteries may check for battery swelling on a shorter periodic basis than when the battery is older. In some cases, as the battery gets older, the battery may be checked for swelling more often. In another example, the user may have the ability to select a setting that determines the frequency that the battery is checked for swelling. In some examples, the battery is checked for swelling during the night or at another time when the demands on the portable electronic device's processing resources are likely lower.

FIG. 15 depicts an example of a method 1500 of detecting a size change. This method 1500 may be performed based on the description of the devices, module, and principles described in relation to FIGS. 1-12. In this example, the method 1500 includes detecting 1502 swelling of a battery assembly incorporated into the portable electronic device when an electrical resistance sensor is compressed and the electrical resistance sensor is incorporated into the portable electronic device where the electrical resistance sensor includes a pressure sensitive material that exhibits a change in electrical conductance when compressed by taking at least one measurement based on a predetermined schedule.

As an example, the portable electronic device may check the battery for swelling in response to a predetermined event. In some examples, the predetermined event may be turning on the portable electronic device, turning off the portable electronic device, making a request of the portable electronic device, making a power intensive request of the portable electronic device, running a specific program on the portable electronic device, executing another user action, or combinations thereof. In some examples, the user may have an option to instruct the portable electronic device to check for swelling on demand. Additionally, in some examples, other predetermined events may include sensing an over heating condition, sensing an update failure, sensing a security breach, sensing an impact of the portable electronic device, sensing a fan speed, sensing another condition of the portable electronic device, or combinations thereof.

In some examples, the portable electronic device may cause an alert to be sent to a user when battery swelling is detected. The alert may be sent to a display of the portable electronic device. In other examples, the alert may be sent to a watch, an email address, a mobile device, another device, or combinations thereof. The alert may be conveyed in a written message, an audible sound, or in another appropriate format. The alert may be sent to the user of the portable electronic device, a network administrator, the manufacturer of the portable electronic device, a technician, a third party, another party, or combinations thereof.

The alert may indicate that the portable electronic device needs maintenance, that the battery needs to be replaced, indicate that the portable electronic device should be handled in a particular way, include another message, or combinations thereof. In some examples, the alert may provide a time frame when the battery should be replaced. In some cases, a time frame for when the battery should be replaced may be based, at least in part, on the amount of force measured with the electrical resistance sensors, the length of time that the pressure in the battery has been building, other factors, or combinations thereof.

In some cases, the alert may provide instructions that the battery should be replaced immediately. In some cases, the alert may provide instructions on how to replace the battery, how to order a new battery, how to locate a technician to replace the battery, other instructions, or combinations thereof.

In some examples, the alert is sent automatically if any increase in pressure is measured. In other examples, the alert is only sent after the increase in pressure reaches a predetermined threshold. In some examples, the alert may be sent based on the rate that the internal pressure of the battery builds over time. For example, gradual increases in pressure over the life of the battery may be determined to be normal and not dangerous to the user. However, in other examples a rapid internal pressure build up may indicate a dangerous situation, thereby triggering the alert.

The portable electronic device with the touch pad may be a laptop, a desk top, an external pad for providing input to a computing device or to the cloud computing device, a computing device, a networked device, an electronic tablet, a mobile device, a personal digital assistant, a control panel, a gaming device, a flat panel, a display, a television, another type of device, or combination thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A portable electronic device, comprising:
    a keyboard in a surface where the surface forms part of an internal cavity;
    a touch sensor disposed within the internal cavity and is configured to sense touch input on the surface;
    an electrical resistance sensor disposed within the internal cavity; and
    a battery assembly being disposed within the internal cavity and adjacent to the electrical resistance sensor;
    the battery assembly also being adjacent to the touch sensor;
    an internal structure connected to an underside of the surface;
    wherein the electrical resistance sensor is positioned to be compressed when the battery assembly moves towards the touch sensor due to swelling;
    wherein the electrical resistance sensor further includes a pressure sensitive material that exhibits a characteristic of changing an electrical conductance when compressed.

2. The portable electronic device of claim 1, wherein the pressure sensitive material is a resistive ink.

3. The portable electronic device of claim 1, wherein the pressure sensitive material is a quantum tunneling composite.

4. The portable electronic device of claim 1, wherein the pressure sensitive material is a void bearing material.

5. The portable electronic device of claim 1, wherein the electrical resistance sensor includes:
    a first electrode connected to a first side of the pressure sensitive material; and
    a second electrode connected to a second side of the pressure sensitive material.

6. The portable electronic device of claim 1, wherein the electrical resistance sensor is in communication with a controller that determines that the battery assembly has an increased size in response to the pressure sensitive material having the changed electrical conductance.

7. The portable electronic device of claim 6, wherein the controller is programmed to use the electrical resistance sensor to take a measurement on a predetermined schedule.

8. The portable electronic device of claim 6, wherein the controller is programmed to use the electrical resistance sensor to take a measurement in response to a predetermined event.

9. The portable electronic device of claim 6, wherein the controller is programmed to determine a force exerted by the battery on the electrical resistance sensor based at least in part on an amount of changed electrical conductance exhibited by the pressure sensitive material.

10. The portable electronic device of claim 1, further comprising a connector that connects the electrical resistance sensor to the underside of the track sensor and provides physical resistance to movement of the electrical resistance sensor as the battery assembly swells thereby causing the electrical resistance sensor to be compressed by the physical resistance of the connector and the battery assembly.

11. The portable electronic device of claim 1, wherein the pressure sensitive material is in series with a resistor and an output node.

12. The portable electronic device of claim 1, further comprising a controller that is configured to store data about which cells of the battery assembly are swollen verse those cells of the battery assembly that are not.

13. The portable electronic device of claim 1, further comprising a voltage divider circuit that is used to detect changes in the electrical resistance sensor.

14. A method of detecting an increased size of a battery, comprising:
    determining a battery positioned in an internal cavity of a laptop and underneath a surface that incorporates a keyboard has an increased sized based, at least in part, on a signal exhibiting a changed electrical conductance where the signal is from an electrical resistance sensor that includes a pressure sensitive material that exhibits a characteristic of changing electrical conductance when the pressure sensitive material is compressed where the electrical resistance sensor detects movement of the battery moving towards the surface incorporating the keyboard.

15. The method of claim 14, wherein the pressure sensitive material is compressed by being sandwiched between a pressure from the battery and a surface within the portable electronic device.

16. The method of claim 14, further including sending an alert to a user when the electrical conductance changes past a predetermined threshold.

17. A computer-program product for use in a portable electronic device, the computer-program product comprising a non-transitory computer-readable medium storing instructions executable by a processor to:
    detect swelling of a battery assembly incorporated into the portable electronic device when an electrical resistance sensor is compressed and the electrical resistance sensor is incorporated into the portable electronic device where the electrical resistance sensor includes a pressure sensitive material that exhibits a change in electrical conductance when compressed;

the portable electronic device including an internal cavity formed in part by a surface that incorporates a keyboard;

a touch sensor is disposed within the internal cavity;

the electrical resistance sensor is disposed within the internal cavity; and the electrical resistance sensor is compressed when the battery swells in the direction of the touch sensor.

18. The computer-program product of claim 17, wherein the instructions are further executable by the processor to take the measurement by:

applying a voltage to a first side of a pressure sensitive material;

measuring a resulting voltage from a second side of the pressure sensitive material; and determining a difference in the resulting voltage from a previous measurement.

19. The computer-program product of claim 17, wherein detecting includes taking at least one measurement based on a predetermined schedule.

20. The computer-program product of claim 17, wherein detecting includes taking at least one measurement triggered by a predetermined event.

* * * * *